United States Patent
Eighmy

(10) Patent No.: US 6,290,637 B1
(45) Date of Patent: Sep. 18, 2001

(54) PHOSPHATE MINERAL-BASED REACTIVE BARRIER CONTAINMENT SYSTEM

(75) Inventor: T. Taylor Eighmy, Lee, NH (US)

(73) Assignee: University of New Hampshire, Durham, NH (US)

( * ) Notice: Subject to any disclaimer, the term of this patent is extended or adjusted under 35 U.S.C. 154(b) by 0 days.

(21) Appl. No.: 09/356,273

(22) Filed: Jul. 16, 1999

(51) Int. Cl.[7] .................. A62D 3/00; B09B 1/00
(52) U.S. Cl. .............. 588/256; 405/129.25; 405/129.65; 405/129.95; 588/252; 588/259
(58) Field of Search .................. 588/236, 252, 588/256, 259; 405/128, 129, 263, 129.65, 129.25, 129.95

(56) References Cited

U.S. PATENT DOCUMENTS

| | | | |
|---|---|---|---|
| 3,959,975 | * 6/1976 | Graf | 61/36 C |
| 4,737,356 | 4/1988 | O'Hara et al. | 423/659 |
| 4,908,129 | 3/1990 | Finsterwalder et al. | 210/170 |
| 5,037,479 | 8/1991 | Stanforth | 106/691 |
| 5,162,600 | 11/1992 | Cody et al. | 588/230 |
| 5,193,936 | 3/1993 | Pal et al. | 405/128 |
| 5,202,033 | 4/1993 | Stanforth et al. | 210/747 |
| 5,502,268 | 3/1996 | Cote et al. | 588/259 |
| 5,512,702 | 4/1996 | Ryan et al. | 588/256 |
| 5,591,116 | 1/1997 | Pierce | 588/256 |
| 5,660,624 | 8/1997 | Dry | 106/677 |
| 5,674,176 | 10/1997 | Pierce | 588/256 |
| 5,710,362 | 1/1998 | Vesilind et al. | 588/251 |
| 5,830,752 | * 11/1998 | Bruso | 435/283.1 |
| 5,877,393 | * 3/1999 | Webster | 588/236 |
| 5,931,773 | * 8/1999 | Pisani | 588/256 |

OTHER PUBLICATIONS

Van der Sloot and Cote, Modeling Chemical Interactions at a Waste/ Waster Interface, 1985, Entire Paper.

Van der Sloot, de Groot, Eggenkamp, Tielen and Wijkstra, Versatile Method for the Measurement of (Trace) Element Mobilities in Waste Materials, Soil and Bottom Sediments, 1987, Entire Paper.

Goumans, Van der Sloot, and Aalbers, Waste Materials in Construction, 1991, Entire Paper.

* cited by examiner

Primary Examiner—Wayne Langel
(74) Attorney, Agent, or Firm—Devine, Millimet & Branch, P.A.; Paul C. Remus, Esq; Kristin Kohler, Esq

(57) ABSTRACT

A phosphate mineral based reactive barrier system. Phosphate minerals are known to be sinks for heavy metal contaminants. The reactive barrier prevents the release of contaminants from waste materials, sediments or dredged materials via reaction with the contaminants at the interface between the barrier and the waste material, sediments or dredged material. The barrier is comprised of a phosphate mineral material where the form of the phosphate mineral is variable but primarily insoluble. This barrier is placed below, around, and/or on top of the contaminated materials such that the contaminated materials are completely enveloped, capped, or contained by a grout curtain. The barrier can be in a (i) slurry form, (ii) blended matrix form with other inorganic agents, or (iii) composite form with a geotextile or geofabric. These methods of construction can be used singly or jointly. In some cases, pH control may be used to optimize the chemical reactions within the barrier system. The barrier mechanism relies on the phenomena of adsorption, surface precipitation and co-precipitation of metal phosphate surface precipitates to chemically retard diffusion from the waste material. Immobilization may also occur secondarily when a small percentage of the phosphate minerals partially dissolve and the phosphate precipitates with metals to form metal phosphate precipitates in the pore water system of the reactive barrier. The contaminated wastes, sediments or dredged materials may have been subjected to solidification or chemical stabilization or other forms of treatment prior to disposal.

13 Claims, 4 Drawing Sheets

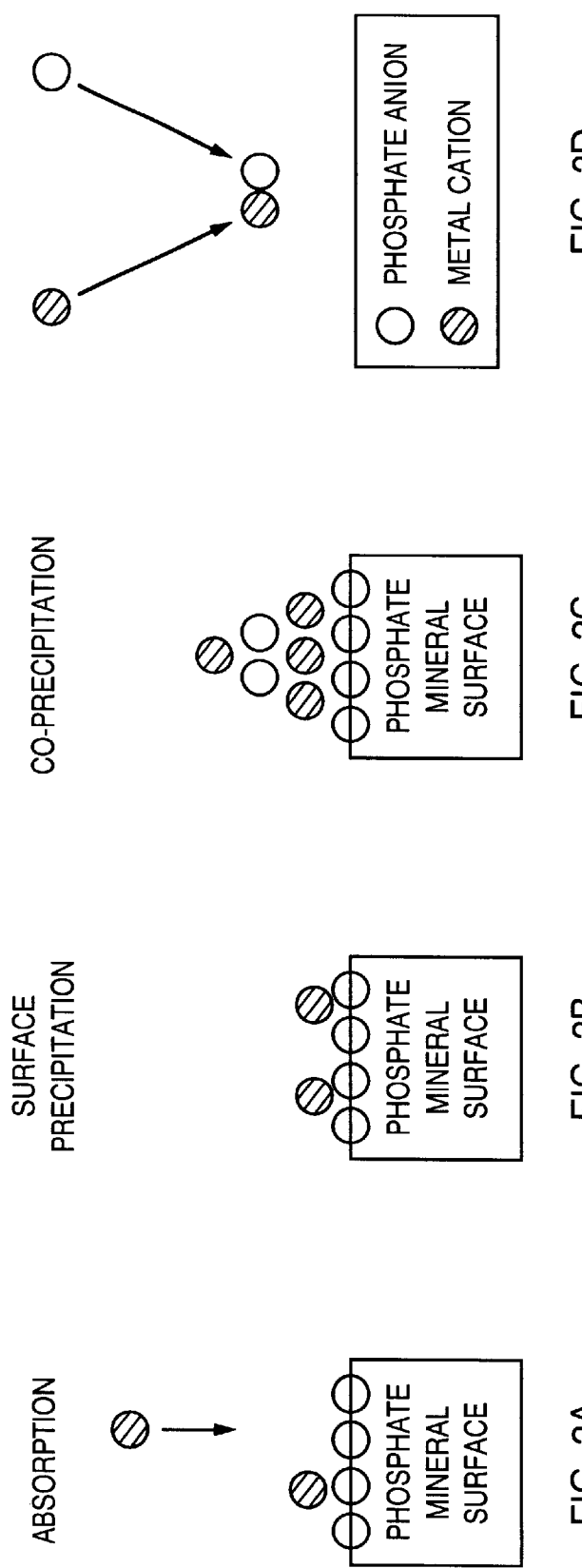

PHOSPHATE MINERAL-BASED REACTIVE BARRIER CONTAINMENT SYSTEM

This invention was made with government support under NOAA Cooperative Agreement No. NA87OR0512 awarded by the National Oceanic and Atmospheric Administration. The government has certain rights in the invention.

FIELD OF THE INVENTION

The invention relates to disposal and storage of contaminated waste materials. More particularly the invention relates to using reactive barriers as containment systems for contaminated waste materials. Most particularly the invention relates to phosphate mineral based reactive barrier containment systems that use the targeted waste materials to form and seal the barrier by chemically and physically reacting with the reactive barrier material.

BACKGROUND OF THE INVENTION

Approximately 400 million cubic yards of sediment are dredged from harbors and waterways in the U.S. each year and up to 12 million cubic yards of very contaminated sediments are handled with special remediation strategies. Heavy metals are one of the most frequently reported contaminants and are problematic with respect to dredge material management. They impact sediment restoration activities throughout the U.S. The lack of available disposal space, the presence of multiple contaminants, and the lack of cost efficient technologies to treat the materials imposes a bottleneck on dredging operations, thus impacting navigation in harbors and waterways. The continued pressing needs for navigable waterways means that innovative dredge material management strategies are needed so that dredging can occur in an environmentally beneficial and cost effective manner.

Disposal sites are used for either the temporary or permanent disposal of contaminated sediments and dredged materials. Until recently, ex situ or terrestrial-based confined disposal systems (landfills) had been widely used for contaminated sediment and dredged materials disposal. However, difficulties in siting landfills as well as the premium placed on the disposal of municipal, industrial, and hazardous wastes in landfills, means that consideration is again being given to coastal, near-shore, off-shore or subsurface disposal in confined disposal sites.

FIG. 1 (from NRC, 1997) depicts some of the types of disposal sites that are currently used for waste containment and disposal. These facilities are designed to meet storage requirements for the contaminated materials and to ensure the control of contaminant release. Each is described below:

Terrestrial landfills

A terrestrial landfill involves the placement of contaminated sediments within an engineered disposal site featuring an hydraulically impervious liner system (either clay or high density polyethylene liners). The landfill, when closed, is then capped with a hydraulically impervious cap system. Traditional liners and cap systems are know to work well. However, over time they may be subjected to geotechnical stresses or environmental deterioration that cause the liners or caps to fail, or be compromised in some other way.

Confined Disposal Sites

Confined disposal sites involve the placement of contaminated sediments within diked near shore, island, or land-based disposal systems. The deposit final grade is above high water (tidal or storm). Materials are typically transported to this site for disposal. Typically, confinement is achieved by the use of retention dikes or structures that enclose the disposal area so that the contaminants are isolated. In some cases man-made islands are made with these systems. Retention dikes have performed well in the estuarine environment. However, they may be subjected to geotechnical stresses or erosion that cause the dikes to lose integrity, allowing release of contaminated materials.

Confined Aquatic Disposal

Confined aquatic disposal involves the placement of contaminated sediments or dredged materials at an open water location within engineered disposal site within an underwater dike or berm system, or in a natural depression, where the system is lined with containment systems. Materials are typically transported to this site for disposal. The system, when closed, is then capped with a with a top containment system. Although the performance of subsurface disposal systems has been generally adequate, the system may be subjected to geotechnical stresses, biological perturbations, or environmental deterioration that causes the containment system to fail.

In-Situ Capping

In-situ capping involves the covering of contaminated sediments (or historically dredged materials) that are left in place in underwater environments. They are not typically moved to another disposal location. Here, the capping concept is used just to cover the deposit. The deposit is left in place. Traditional subsurface caps have usually worked well. However, they may be subjected to geotechnical stresses, or biological perturbations that cause the cap to fail, or be compromised in some other way.

Chemical Reaction

Chemical stabilization of inorganic waste materials offers the potential to reduce the leachability of heavy metal contaminants present in the waste. The principal objective during stabilization is to precipitate new solid mineral phases with both reduced solubilities and increased geochemical stability with respect to solution phase ligands, pH, or redox ($E_h$). One stabilization agent of recent interest for heavy metals is orthophosphate: $PO_4^{3-}$. Phosphate combines with over 30 elements to form about 300 naturally-occurring minerals. Metal phosphates are ubiquitous secondary minerals in the oxidized zones of lead ore deposits and as assemblages around ore bodies. They also occur in soils, sediments, and phosphatic or phosphorite beds. As such, they are very stable geochemically with respect to pH, $E_h$, and mineral authigenesis. Isomorphic substitutions are common in nature for these phosphate minerals for both divalent cations (e.g. $Pb^{2+}$ for $Ca^{2+}$) and oxyanions (e.g. $AsO_4^{3-}$ for $PO_4^{3-}$). They are also very insoluble minerals. Notable among the phosphate minerals are the apatite family of minerals; e.g., $Ca_5(PO_4)_3F$ (fluoroapatite), $Ca_5(PO_4)_3OH$ (hydroxyapatite), $Ca_{10}(PO_4, CO_3)_6(OH)_2$(carbonate apatite), etc.

Past research efforts have shown that phosphate minerals, including apatites, are likely controlling solids for $Ca^{2+}$, $Cd^{2+}$, $Cu^{2+}$, $Pb^{2+}$ and $Zn^{2+}$ in soil systems. As controlling solids, these mineral phases are both stable geochemically and, by virtue of their insolubility, able to control the aqueous concentration of their heavy metal constituents at very low levels.

The use of orthophosphate to immobilize metals has been advocated for industrial wastewaters, and metal-bearing industrial wastes such as municipal solid waste combustion residues. Both soluble orthophosphate and phosphate-containing minerals have been promoted as sources of orthophosphate for the stabilization process.

Possible stabilization mechanisms can involve a continuum from surface sorption processes to existing particulate surfaces in a waste material, through the formation of surface precipitates, to the formation of discrete heterogeneous or homogeneous precipitates.

Mechanisms

To date, heavy metals have been successfully chemically stabilized in terrestrial environments in soils, mining wastes, and industrial wastes using orthophosphate ($PO_4^{3-}$) as a chemical stabilization agent. This process is used commercially in many venues in both the U.S. and abroad at low cost. Phosphate can react with a many heavy metals (e.g. Cd, Cu, Ni, Pb, Zn) and metalloids (e.g. $AsO_4^{3-}$) to precipitate out and form Ca-based apatite family minerals (e.g. $Pb_5(PO_4)_3Cl$ or $Ca_5(AsO_4)_3Cl$). Further, many marine phosphorites, which a phosphate-based and largely contain apatite-family minerals also contain heavy metals such as Pb and Cd which have substituted for the Ca in the crystal lattice.

The apatite family of minerals is well documented. In nature, the apatite mineral structure conforms to the 6/m class of mineral with hexagonal crystal structure and the generic formula $Me_5(XO_4)_3Z$ where Me is Ca, Sr, Ba, Cd, and Pb (typically), X=P, As, V, Mn, and Cr; and Z=OH, F, Cl, and Br. The propensity to form very insoluble apatite family minerals with end members that contain other divalent metals like Pb and Cd is the principal feature that we would like to take advantage of during heavy metal stabilization. The apatite family includes the minerals abukumalite, britholite, carbonate apatite, chloroapatite, dahllite, ellestadite, fermorite, fluoroapatite, francolite, hydroxyapatite, mimetite, pyromorphite, svabite, vanadinite, and wilkeite.

It is possible to make synthetic hydroxyapatite, fluoroapatite and chloroapatite minerals that conform to the same mineral structure and formula as natural apatites; although some can have distorted habits. In hydroxyapatites, the calcium can be substituted with divalent, hexavalently coordinated cations with ionic radii between 0.69 and 1.35 Å. This includes the elements Ba (1.34 Å), Cd (0.97 Å), Co (0.72 Å), Cu (0.72 Å), Mg (0.66 Å), Mn (0.80 Å), Ni (0.69 Å), Pb (1.20 Å), and Sr (1.12 Å). The orthophosphate can be substituted with oxyanion-forming elements with ionic radii between 0.29 and 0.60 Å. This includes As (0.46 Å) and V (0.59 Å). In chloroapatites, the calcium can be substituted with divalent, hexavalently coordinated cations with ionic radii between 0.80 and 1.35 Å. This includes the elements Ba (1.34 Å), Cd (0.97 Å), Mn (0.80 Å), Pb (1.20 Å), and Sr (1.12 Å). The orthophosphate can be substituted with oxyanion-forming elements with ionic radii between 0.29 and 0.60 Å. This includes As (0.46 Å) and V (0.59 Å). These isomorphic substitutions can be complete for elements like Pb, Sr, and Ba, as evidenced by minerals like chloropyromorphite ($Pb_5(PO_4)_3Cl$) or partial for elements like Zn, Cu, Ni, and Ca; forming solid solutions like $(Ca,Zn,Pb)_5(PO_4)_3OH$. This propensity to form coprecipitates or solid solutions is another one of the features that we would like to take advantage of during heavy metal stabilization.

Apatites are the predominant mineral phase in marine sedimentary phosphorite deposits. Their solubilities are extremely low and their geochemical stabilities are high at pH, ionic strength, and organic ligand levels associated with sedimentary deposits. Their extremely low solubilities, wide predominance fields with respect to pH and Eh, and their geochemical stability over geologic time are all prerequisites for a good heavy metal stabilization system. Apatites are geochemically stable—they are the most common diagenic product of sedimentary accretion of phosphate in marine sediments and are found in moderately reducing to highly oxidized environments. Sediment bacteria may play a role in the onset of crystallization in sediment pore waters. In nature, as phosphorite deposits accumulate, they also scavenge trace metals via the above mentioned isomorphic substitution reactions. A great deal of information is known about apatite behavior in seawater—from crystallization sequences, to thermodynamic data like solubility constants and $\Delta G_f^o$, to precipitation/dissolution kinetics.

Apatites have been well characterized with regards to structure and surface properties. These features are the basis for precipitation or sorption reactions involving heavy metals. The synthesis of apatite minerals is fairly well. The synthesis and study of binary and ternary solid solutions for heavy metal substitution with calcium in apatites has been explored. Apatites remain one of the more preferred minerals to study solid solution formation. This propensity in part explains the widespread occurrence on heavy metals in apatite-based marine phosphorite deposits. There has been extensive research on the immobilization of metals by apatites. There has also been a great deal of research on the sorption of metals to hydroxyapatite; particularly in the geochemical literature and the dental research literature. The theoretical basis for distinguishing sorption versus precipitation has been reviewed. The theoretical basis for solid solution formation at surfaces has been well studied and modeled from a thermodynamic perspective. Some work relating surface and bulk spectroscopic characteristics to end members and solid solutions has been done; but not in a systematic fashion.

Related Research

More recently, Applicant's related work at the University of New Hampshire has shown that during heavy metal stabilization, solid solutions of apatite-family minerals form; particularly binary solid solutions (e.g. Pb and Ca, Cd and Ca, etc.). These solid solutions exhibit lower solubilities than the end members by virtue of the "burial" phenomena that occurs when two dimensional sorption convert into three dimensional surface precipitation at the reaction surface. These can reduce leachabilities to very low levels (e.g. below detection to low part per trillion levels for Pb) and immobilize virtually all of the operationally-available heavy metal in the waste material.

For waste materials such as sediments containing heavy metal contaminants, the sequence whereby metal phosphate precipitates are produced involves two types of reaction paths: precipitation at surfaces and precipitation from solutions. FIG. 2 schematically depicts both known mechanisms.

Apatites have a propensity to adsorb and scavenge numerous metal cations such as cadmium, lead and zinc. Under ideal conditions, this sorption process can result in quite high coverage of the surface as a monolayer on the sorption sites. Ideally, the sorbed layer can become three dimensional and create a solid solution between the substrate mineral (e.g. $Ca_5(PO_4)_3OH$) and the sorbed species (e.g.

$Pb_5(PO_4)_3OH$). After sorption, some substitution for calcium can occur in the apatite crystal lattice and at very high metal concentrations, apatites can either undergo partial dissolution so that more insoluble apatite family minerals can form, or co-precipitation of other phosphate mineral phases can occur at the surface where the phosphate mineral is not a solid solution between the end members. An example of this is $Zn_3(PO_4)_2 \cdot H_2O$ precipitating rather than $Zn_5(PO_4)_3OH$ on the hydrated $Ca_5(PO_4)_3OH$ surface. This later situation is likely in less ideal situations, though it still constitutes precipitation and removal of the metal contaminant.

Precipitation reactions from solutions involves the following reaction sequences. As illustration, the general sequence whereby $Ca^{2+}$ and $PO_4^{3-}$ form calcium phosphate minerals is offered. When $Ca^{2-}$ and $PO_4^{3-}$ are titrated in solution, a variety of metastable intermediate phases form as part of a precipitation reaction sequence. In a simple system, the reaction sequence generally involves $Ca_9(PO_4)_6$ (non-stoichiometric amorphous calcium phosphate), $CaHPO_4 \cdot 2H_2O$ (brushite); $CaHPO_4$ (monetite); $Ca_8H_2(PO_4)_6 \cdot 5H_2O$ (octacalcium phosphate), $Ca_3(PO_4)_2$ (whitlockite); and ultimately $Ca_5(PO_4)_3OH$ (hydroxyapatite); the most geochemically stable calcium phosphate end product of the sequence. The sequence is influenced by ion activity products for the mineral phases in question, pH, ionic strength, reaction kinetics, the presence of precursor substrates or "seed", and the presence of inhibitors like $Mg^{2+}$. Similar classes of reaction sequences, intermediaries, and end products are also seen for other metals; notably $Pb^{2+}$. This concept is also applicable for solid solutions of these minerals; e.g. ternary metal apatites where $Pb^{2+}$, $Cd^{2+}$, $Cu^{2+}$, and $Zn^{2+}$ isomorphically substitute for $Ca^{2+}$ and form solid solutions like $(Ca, Pb, Zn)_5(PO_4)_3OH$.

It would be expected that in a reactive barrier system containing phosphate minerals, some modest dissolution of the mineral phase would occur and then provide orthophosphate for the above mentioned precipitation reaction within the reactive barrier pore water system. While this is not the principal reaction, it is one that will likely occur. It has been suggested that under certain conditions of pH and metal concentration; more insoluble apatite phases such as hydroxypyromorphite ($Pb_5(PO_4)_3OH$) will form upon the dissolution of hydroxyapatite ($Ca_5(PO_4)_3OH$). This can be analagous to a chemical stabilization reaction involving dissolved constituents.

Under optimum pH and ionic strength conditions, the rate of nucleation of cystallites from the pore water is influenced by the degree of super saturation, crystallite-solution interfacial energy, collision frequency and efficiency, and temperature. The interfacial energy ($\gamma$ or $\sigma$, $mJ/m^2$) is of the utmost importance in determining the thermodynamic stability of the products and the kinetics of the crystallization process. The Ostwald step rule or "rule of stages" stipulates that the precipitate with the highest solubility (e.g. least stable) will form first in a consecutive precipitation reaction. This occurs because the nucleation of a more soluble phase is kinetically favored by virtue of its lower interfacial tension. Directly associated with the Ostwald step rule is the Kelvin effect: small crystal particles become more soluble as size deceases; directly resulting from the increase in interfacial surface tension as particle surface areas to volume ratios decrease. Ostwald ripening involves the general maturation sequence during mineral precipitation where smaller, less stable, more immature crystals coalesce into larger, more well-ordered, more stable, and more mature crystals with reduced solubility.

Many of the terrestrial wastes that are successfully stabilized with orthophosphate also contain organic contaminants, autochthanous organics (fulvics and humics), active aerobic and anaerobic microbial populations, and salts with ionic strengths comparable to or exceeding those of marine sediments and sediment pore water systems. Although the orthophosphate does not react with the organic contaminants, the presence of these organic contaminants in terrestrial waste systems also does not inhibit or interfere with the orthophosphate stabilization reaction. To date, however, there has been no systematic interest in, or work done on, examining the applicability of orthophosphate for dredged materials and contaminated sediments, though the potential exists from a geochemical basis as discussed above.

Based on the background detailed above, it can be seen that there is a need for a different type of barrier that will function in many different physical environments and that will not only physically contain contaminated waste material, but can immobilize waste materials such that even if the structure of the barrier is compromised over time, waste material will not be released to the environment.

SUMMARY OF THE INVENTION

A basic embodiment of the invention is a system and method that uses the disposal concepts listed above combined with the use of geochemically-reactive barriers for containment of target waste contaminant materials including heavy metals, metalloids, and other periodic table elements of concern in contaminated waste materials. Specifically, phosphorites (phosphate-based mineral deposits), or their analogues, may be used in caps, liners, grout curtains or barriers for contaminated sediment and dredged material deposits to stabilize inorganic waste materials.

The reactive barrier of the present invention insures the long term integrity of disposal sites for contaminated wastes, sediments and dredged materials. The concept of the reactive barrier if the invention is that the barrier is a single layer that reacts with components in the disposed material to reduce the likelihood of passive release of the contaminants from the disposal site. Ideally, the reactive barrier system is considered to provide insurance as to the environmental security and long term effectiveness of the disposal site.

The phosphate mineral-based reactive barrier system of the present invention is comprised of a phosphate mineral material where the form of the phosphate mineral is variable. The barrier is of relatively simple construction and does not require the addition of any type of clay or other stabilizer in order to finction in its basic form. Nor does the invention require multiple reactive layers in order to form a barrier against contaminated materials and be effective, as is the case with prior reactive barriers. This barrier is placed below, around, and/or on top of contaminated sediments, dredged materials, or other waste materials such that the waste materials are contained by a grout curtain, liner system, or cap. The reactive barrier is an engineered component of a disposal site. The barrier can be in a (i) slurry form, (ii) blended matrix form with other inorganic agents to provide geotechnical stability, or (iii) composite form incorporated with a geotextile or geofabric. The barrier of the present invention may be used with known methods of construction and can be used singly or jointly to completely surround contaminated material. In some cases, pH control, clay stabilizers or other additives may be used to optimize the barrier system, especially where the reactive barrier is used in a terrestrial treatment and/or containment system.

The barrier prevents the release of metal contaminants or other target periodic table contaminant elements (especially heavy metals) from the sediments, dredged materials, or waste materials via reaction with the contaminants at the interface between the barrier and the contaminants. The barrier mechanism relies on the phenomena of adsorption, surface precipitation and co-precipitation of metal phosphate surface precipitates to chemically retard diffusion from the sediments or dredged materials. Occasionally, a small portion of the phosphate minerals will dissolve and the phosphate will precipitate with metals to form metal phosphate precipitates in the pore water system of the reactive barrier. As dissolved metals attempt to diffuse from the contaminated materials to the interface and into the reactive barrier, retention reactions will occur that greatly reduce the apparent diffusivity of the dissolved metals, thus maintaining the contaminants within the containment system either temporarily or permanently. The contaminated sediments, dredged materials or other contaminants may have been subjected to chemical stabilization or other forms of treatment prior to disposal. Other types of organic contaminants may be present in the sediments or dredged materials; however, these other contaminants do not react with the reactive barrier and do not inhibit the functioning of the reactive barrier.

BRIEF DESCRIPTION OF THE DRAWINGS

FIGS. 2a–d are schematic diagrams showing known physiochemical reactions that can occur in a reactive barrier of the invention.

DETAILED DESCRIPTION OF THE INVENTION

Figure 1:
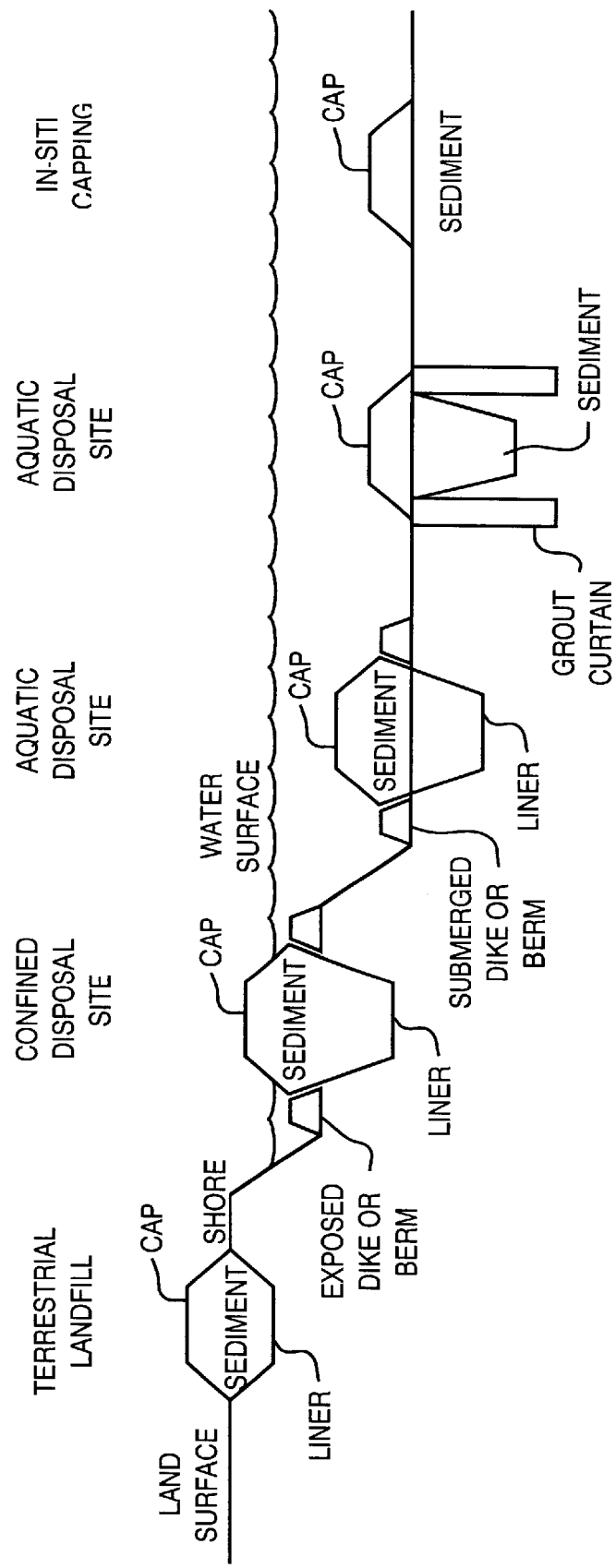
FIGS. 1 is a schematic diagram showing various known types of disposal sites with traditional containment mechanisms.

The following is a description of the present invention using the definitions and elaborations as defined in this section, and wherein like reference numerals refer to like elements throughout. The invention comprises a phosphate mineral-based reactive barrier system and method of use, to contain contaminated material, including contaminated sediment and dredged material, by physiochemically stabilizing and immobilizing the contaminants, in both water based and terrestrial disposal sites. The phosphate mineral based reactive barrier system is comprised of a phosphate mineral material where the form of the phosphate mineral is variable. The barrier is of relatively simple construction and does not require the addition of any type of clay or other stabilizer in order to finction in its basic form. Nor does the invention require multiple reactive layers in order to be effective, as is the case with prior reactive barriers.

The present invention is a waste-activated, waste-induced, or waste-dependent barrier. Unlike some prior art, there is no need for a two layer system in which the two layers react with each other first to form a physical barrier independent of the waste material. The barrier material of the present invention actually reacts with the waste material contaminants to form a barrier of ever increasing imperviousness as the contaminants react with the barrier materials. In the most basic embodiment, there is no need to add any type of pH controlling agent or clay stabilizer to the barrier material to optimize immobilization in the barrier, but such additives may be used to optimize performance of the barrier, depending on the environmental conditions of the location of the disposal site. The reactive barrier system of the present invention does need an aqueous environment in order to react but may be used in conjunction with common terrestrial systems or stabilizers, as an additional containment means. In such a system, the reactive barrier would remain un-reacted unless or until the main containment system fails and water and contaminant material contacts the reactive barrier material, thus beginning the reaction and formation of the reactive barrier. Thus with the present invention there is essentially a two step process. There is no physical barrier unless or until contaminants, in an aqueous medium, start to chemically react with the barrier material. Then, as the chemical reaction between the contaminant and the reactive barrier material progresses, the contaminant is immobilized both chemically and then physically as the spaces between the particles of reactive barrier material are filled with chemically reacted compounds thus physically preventing passage of contaminants through the reactive barrier, even if all sites for chemical reaction have been reacted and are filled. In addition, if there is a physical shift or disturbance at the disposal site and the reactive barrier is breached, new reaction can occur to physically and chemically seal the breach.

The barrier may be placed below, around, and/or on top of contaminated wastes, sediments or dredged materials such that the sediments, dredged materials or wastes are contained by a grout curtain, liner system, or cap. The reactive barrier is an engineered component of a disposal site. The barrier can be in a (i) slurry form, (ii) blended matrix form with other inorganic agents to provide geotechnical stability, or (iii) composite form incorporated with a geotextile or geofabric. The barrier of the present invention may be used with known methods of construction and can be used singly or jointly to completely surround contaminated material. In some cases, pH control, clay stabilizers or other additives may be used to optimize the barrier system, especially where the reactive barrier is used in a terrestrial treatment and/or containment system.

A phosphate mineral as used in the present description refers to natural or anthropogenic inorganic minerals or geologic materials where the form of the phosphorus in the mineral is largely as orthophosphate ($PO_4^{3-}$), though other forms of phosphates such as condensed phosphates, polyphosphates, or meta-phosphates may be present. The form of phosphate mineral used is primarily, but not limited to a powder, or crushed solid containing phosphorus such that the actual speciation of the phosphorus at the time of precipitate nucleation is predominantly orthophosphate ($PO_4^{3-}$). It can include synthetic phosphate minerals or powders made from phosphate salts (e.g. but not limited to $CaHPO_4$, $Ca_3(PO_4)_2$, $Ca_5(PO_4)_3OH$, $Ca_5(PO_4)_3Cl$, $Ca_2P_2O_7$, $KH_2PO_4$, $K_2HPO_4$, $K_3PO_4$, $K_4P_2O_7$, $Mg_3(PO_4)_2$, $Na_2HPO_4$, $NaH_2PO_4$, $Na_4P_2O_7$). It can include natural geologic materials such as phosphate rock, phosphate mining wastes, marine phosphorite deposits, phosphate fertilizer, and phosphogypsum waste. It can also include crushed solids made from phosphate rock, phosphate mining wastes, phosphorite deposits, phosphate fertilizer, and phosphogypsum waste.

The contaminated materials containable by the reactive barrier of the present invention are typically those fine grained organic and inorganic deposited materials existing in river beds, bays, harbors, and navigational channels.

These materials are contaminated with pollutants and their presence constitutes a threat to navigation, human health, and the environment. "Dredged materials" or dredge spoils refers to those contaminated sediments that have been dredged, mined, excavated, or collected for treatment or disposal. The reactive barrier may also be used with terrestrial disposal sites, in conjunction with traditional containment methods.

The method and system may be used alone or with various containment structures including, a grout curtain, a liner system, a cap, or other similar systems. A grout curtain refers to surrounding or partially enclosing the contaminated sediment or dredged material by a reactive barrier used as a grout curtain, grout wall, or trench to contain the deposited material at a confined disposal site for a either a temporary time or because other geologic features at the site constitute natural containment systems.

A liner system is a system wherein the contaminated sediment, dredged material or other waste comprises a three dimensional liner system (of defined thickness) that completely surrounds, contains, encloses, covers, the contaminated material so that the material is contained by, surrounded by, or enveloped by the reactive barrier as a way to contain the deposited material at a disposal site.

The use of only a cap results in the contaminated sediment, dredged material or other waste being partially contained, enclosed, covered, by a reactive barrier used as a cap to contain the deposited material at a confined disposal site for a either a temporary time or because other geologic features at the site constitute natural containment systems.

Thus, the method and system of the present invention may be used alone or with any engineered component wherein the reactive barrier system is designed, specified, constructed, and placed in, around or upon contaminated material at the confined disposal facility.

A disposal site or facility, as used in this description, is the common terminology for a disposal facility, disposal site, containment site, or waste site, whether in a terrestrial or water environment. In a water environment, the reactive barrier is placed above or below the water line within a bay, estuary, harbor, near-shore, or off-shore environment within the freshwater, saline, estuarine, or marine setting for the temporary storage or permanent disposal of contaminated sediments or dredged materials. In some instances where time or natural geologic settings are factors, the disposal system may contain only a cap or a grout curtain as the method of confinement.

An example method of preparing and deploying the reactive barrier system in a water based environment comprises the steps of: forming a reactive phosphate barrier material containing phosphorus predominantly in the form of orthophosphate; blending the reactive phosphate barrier material with an aqueous system, with or without stabilizing agents; pumping the blended reactive phosphate barrier material into a prepared or engineered disposal site; filling the disposal site with contaminated waste; and allowing the reactive phosphate barrier material to react with contaminants in the contaminated waste, sediments, or dredged material in an aqueous system. The wastes are not mixed with the reactive barrier material, but rather are contained by it. A key to the system is that the phosphates used are predominantly insoluble in an aqueous system and can thus be deployed in an underwater environment and will remain in place to receive waste. Some previous terrestrial systems could not be employed under water because they depend on reactions that occur with soluble phosphates that dissolve and then precipitate out of solution. Such a system would not work under water because the soluble reactants would dissolve in the surrounding water and would be carried away. However the insoluble phosphates of the present invention may be used in both land and water based disposal sites, and are especially suitable for water environments.

The reactive phosphate barrier material may be in one of a number of forms, including a slurry, a blended matrix or a composite. A slurry is one form whereby the phosphate minerals are incorporated into the reactive barrier material component of a confined disposal system and is used for construction of a complete envelope, a cap, or a grout curtain. The slurry is made by blending the phosphate minerals with freshwater, estuarine water, seawater or other aqueous systems so that the material may be pumped and deposited underwater, and will remain in place.

A blended matrix is another form whereby the phosphate minerals are incorporated into the reactive barrier material component of the confined disposal system, and is used for construction of a complete envelope, a cap, or a grout curtain. The blended matrix is made by blending the phosphate minerals with freshwater, estuarine water, seawater or other aqueous systems so that the material may be pumped and deposited underwater. The crucial distinction between the slurry and the blended matrix is that the blended matrix may contain clays, zeolites, cements, grouts, or other agents that impart geotechnical properties to the matrix so that the matrix is stronger, more durable, or more ridged than the slurry. This would be used where issues of turbulence, current, wash, scour, erosion, subsurface waves, slumping and slope stability are a concern.

A composite is another form whereby the phosphate minerals are incorporated into the reactive barrier component of the confined disposal system. The composite is used for construction of a liner or a cap. The composite is made by incorporating, enmeshing, enclosing, adhering, or bonding the phosphate minerals to synthetic two dimensional sheets of geotextiles or geofabrics or their equivalent. The geotextiles or geofabrics can then be placed at the disposal site. Geotextiles and geofabrics are synthetic polymer fabrics or sheets that are used in geotechnical construction applications.

Methods of construction differ between the slurry, the blended matrix and the composite for either an envelope, cap or grout curtain. Traditional civil and marine engineering practices may be used for the construction of the confined disposal facility incorporating these elements.

The type of target contaminated materials for which the present invention is well suited comprise primarily inorganic chemical elements that can form precipitates with orthophosphate. These include, but are not limited to: aluminum, arsenic, barium, beryllium, bismuth, bromine, cadmium, calcium, cerium, chlorine, chromium, cobalt, copper, erbium, fluorine, hydrogen, iron, lanthanum, lead, lithium, magnesium, manganese, mercury, nickel, niobium, nitrogen, oxygen, potassium, scandium, silicon, sodium, strontium, sulfur, tantalum, titanium, thorium, uranium, vanadium, yttrium, and zinc. The system takes advantage of their chemical state ("species") in the sediments or dredged materials, in the sediment pore water system, and in the ripening metal phosphate precipitate. Typically metal contaminants such as cadmium, copper, lead, mercury, nickel, and zinc are considered "heavy metals" and are some of the main target elements of the present system.

When the method and reactive barrier system are employed to treat and contain a waste, a reactive interface is formed at the region where the slurry, cap or composite contact the contaminated waste, sediments or dredged materials, and where various chemical and physiochemical reactions occur. One such reaction is adsorption which is a physicochemical process where a dissolved species (adsorbate) will diffuse to and chemically bond with a hydrated surface (adsorbent). The type of bond that forms depends on the adsorbent and the adsorbate. Here, the type of adsorption would be short range bonds. Traditionally, adsorption refers to the formation of something less than a monolayer on surface sites on the adsorbent surface (this case, the surface of a phosphate mineral) as shown in FIG. 2a and is reversible.

Another type of reaction occurring at the reactive interface is surface precipitation, shown in FIG. 2b, which is a physicochemical process where a dissolved species will continue to adsorb to a monolayer and form a three dimensional structure on the adsorbent surface. Typically the surface precipitate is a solid solution between the adsorbent solid and the and the surface precipitate. For apatites, an ideal depiction of this is where the adsorbent may be hydrated $Ca_5(PO_4)_3OH$, the adsorbate may be $Pb^{2+}$, and the surface precipitate is $Pb_5(PO_4)_3OH$. Under non ideal conditions, adsorption and surface precipitation is more generally a function of the minimization of the Gibbs free energy of the reaction and surface sites are non-ideal. Additionally, the types of solid solutions that form are more complex.

A third type of reaction occurring at the reactive interface is co-precipitation, shown in FIG. 2c, which results in co-precipitates. Co-precipitation is a physicochemical process where a dissolved species will continue to precipitate as solid solutions irrespective of the surface.

There may also be precipitation from reaction of phosphate anions with metal cations in pore water solutions as the contaminated waste in an aqueous system contacts the reactive barrier material and penetrates into pores or spaces between the particles of the reactive barrier.

The products resulting from the reaction of the contaminants with the reactive barrier material of the present system include metal surface phosphate precipitates and metal phosphate precipitates. The term "metal phosphate surface precipitate", as used here, typically denotes, but is not limited to: the product of a phosphate chemical stabilization process; a phosphate crystal; an amorphous phosphate crystal; a phosphate mineral; a phosphate reaction product; an inorganic phosphate particulate; a controlling solid containing phosphate, and a particle containing phosphate. It is the envisioned end product of the surface precipitation reaction. The term "metal phosphate precipitate", as used here, is similar to "metal phosphate surface precipitate" but typically denotes, but is not limited to: the product of a phosphate chemical stabilization process; a phosphate crystal; an amorphous phosphate crystal; a phosphate mineral; a phosphate reaction product; an inorganic phosphate particulate; a controlling solid containing phosphate, and a particle containing phosphate. It is the envisioned end product of any precipitation reaction that may occur with the reactive barrier pore water system.

During the process of reaction of the contaminants with the reactive barrier, the contaminants migrate towards and into the reactive barrier material by the process of diffusion which is a physicochemical process where dissolved contaminants migrate from regions of high concentration to regions of low concentrations in response to a chemical driving gradient. The diffusion can be chemically retarded by the combination of surface and pore water precipitation reactions within the reactive barrier that remove the contaminants from the aqueous system, thus retarding the diffusion of the contaminants through the barrier. As the reaction continues, ripening of the precipitate occurs and includes but is not limited to: precipitate aging, crystal aging, crystal maturation, crystal paragenesis, crystal growth, crystallization, particle formation. Thus as the contaminants diffuse into, and become physically and chemically part of the reactive barrier, the apparent diffusivity of the contaminants is lowered because it becomes harder for new contaminant materials to move into the reactive barrier. The apparent diffusivity is a modified diffusion coefficient that incorporates elements of tortuosity and chemical retardation. Thus, the reactive barrier becomes a sink for the contaminants, meaning that the reaction mechanism removes the contaminant from the system or makes it unavailable for diffusive migration. The notion that sufficient surface sites are present within the barrier for all the available contaminants in the contaminated sediments or dredged material is embodied in this sink concept.

As the contaminants move into, and react with, the reaction barrier, they are stabilized chemically and/or are immobilized or solidified. The terms "solidification" and "chemical stabilization", as used here, typically denote, but are not limited to: the process of treatment or immobilization of elements of concern in a contaminated sediment or dredged material so that leachability or bioavailability of the elements of concern is reduced and/or made harmless, non-hazardous, or more innocuous. Solidification involves the reduction of the surface area to volume ration of the sediments by making the material monolithic. Chemical stabilization frequently involves the partial or complete dissolution of the waste so that the chemical stabilization agent can react with the elements of concern so that new, more insoluble precipitates form. The reactive barrier may be used therefore as insurance above and beyond a principal treatment system. For example, contaminants such as PCBS, PAHs, petroleum wastes, etc. are typically found in contaminated sediments and dredged materials, yet these types of compounds, although they do not react with the reactive barrier, also do not interfere with or inhibit the action of the reactive barrier and thus the reactive barrier may be used for material that contains a mixture of wastes.

Figure 3B:
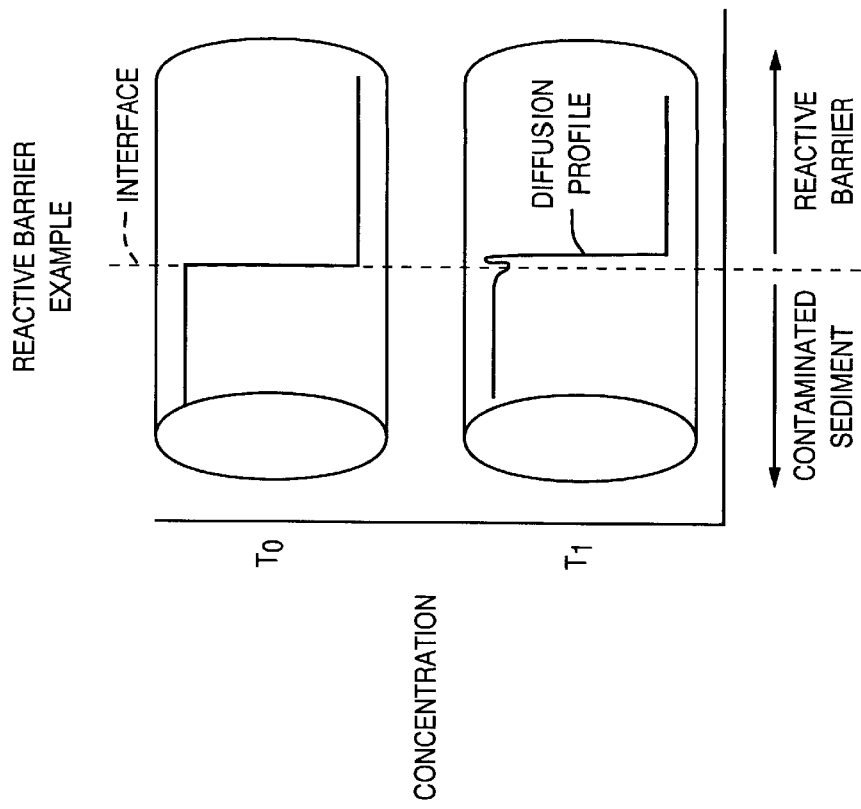
FIGS. 3a and b are schematic diagrams showing graphs and equations of reactions occurring at the reactive barrier of the invention wherein the reactive barrier acts as a sink for the contaminants versus a control sample in which there were no contaminants to react with the material of the barrier used with various methods of application to disposal sites.
Figure 3A:
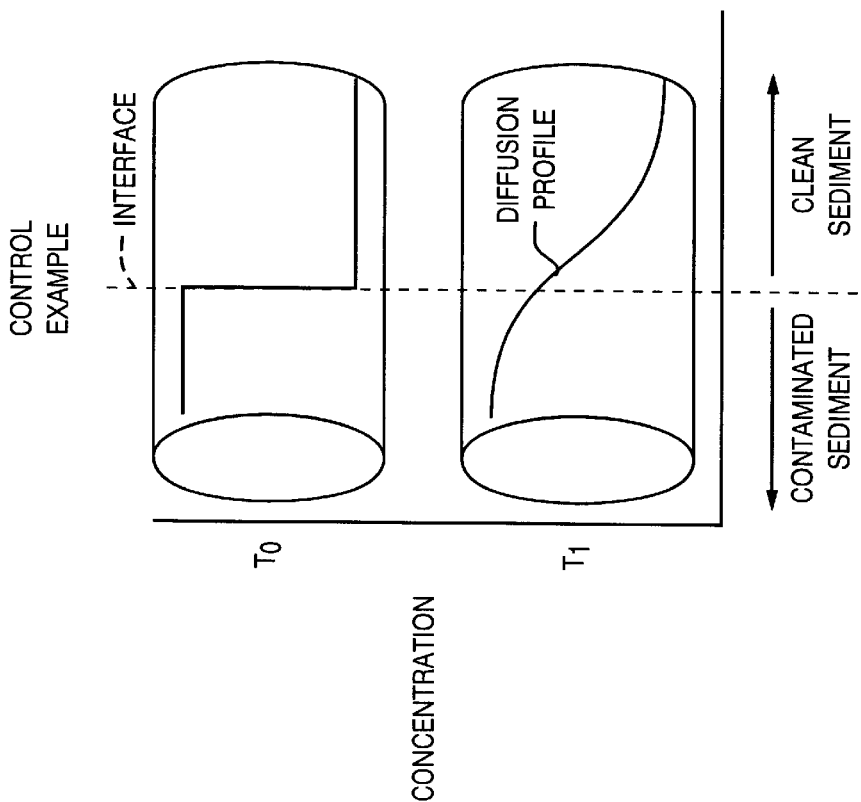

An example of the reactive barrier material acting as a sink is shown in FIG. 3b versus a control, uncontaminated sample shown in FIG. 3a. FIGS. 3a and 3b provide equations for, and depict, the processes that are occurring at the interface between the contaminated sediment or dredged material and the reactive barrier. To illustrate the phenomenon, a control situation is depicted in FIG. 3a, wherein a clean sediment is placed adjacent to the contaminated sediment. In the control situation, the diffusion of the metal contaminant from the regions of high concentration to the regions of low concentration occurs by a process termed Fickian diffusion (from Fick's Law). As shown in the equation below (van der Sloot, 1987):

$$C = \frac{1}{2} \cdot C_o - erfc\left[\frac{x}{2 \cdot \sqrt{(D_e \cdot t)}}\right]$$

the concentration, C, of the contaminant at some coordinate distance x from the interface is a function of the initial concentration ($C_o$), the effective diffusion coefficient of the contaminant in the matrix ($D_e$), and time (t). The error function term (erfc) is a mathematical operator.

In the reactive barrier situation, where adsorption, surface precipitation, and co-precipitation are occurring so that the barrier acts as a sink for the diffusing contaminant, the following relationship is used to describe the how chemical reaction alters the diffusion coefficient with respect to distance x from the interface (van der Sloot, 1987):

$$D_{e,x} = \frac{D_x}{1 + \left[K_d \times \rho \left(\frac{1-\varepsilon}{\varepsilon}\right)\right]}$$

where $K_d$ is a distribution coefficient generally accounting adsorption, surface precipitation and co-precipitation, $\rho$ is the density of the reactive barrier, and $\varepsilon$ is the porosity of the reactive barrier. $K_d$ values can be extremely high for phosphate mineral systems; thus causing the surface of the phosphate mineral to act as a large sink for metal contaminants.

The reaction rates may be optimized by "pH-control", which may include the metered use of acids or bases to maintain reactive barrier pH so that adsorption, nucleation, crystal growth, crystal ripening and crystal maturation is optimized with respect to the reaction system. pH domains can be fairly crucial to the reaction process if the pH of the slurry, the blended matrix, or the composite needs pH-control relative to the disposal environment or the contaminated sediments or dredged materials.

Figure 4:
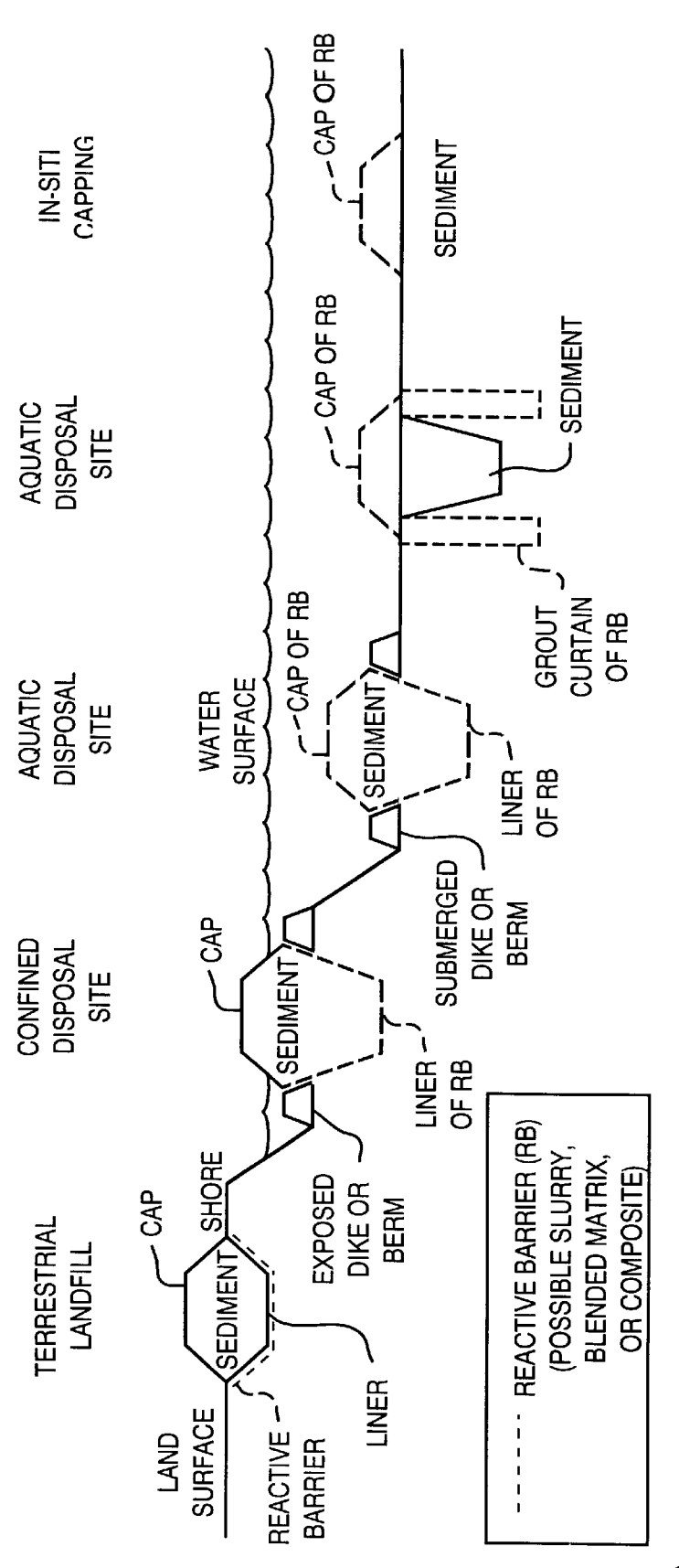
FIGS. 4 shows various types of disposal sites and methods with which the present invention may be used.

The reactive barrier method and system may be used with the various types of disposal sites and mechanisms described above, and may also be used for temporary or permanent storage of contaminated materials wherein temporary includes instances wherein regulatory agencies may wish to store contaminated sediments or dredged materials at temporary confined disposal sites until other more permanent sites are used. On the other hand, regulatory agencies may intend to store contaminated sediments or dredged materials for the design life of the confined disposal facility and the present invention would be suitable for either temporary or permanent storage. Thus, the reactive barrier method and system may be used in all types of disposal sites as shown in FIGS. 4a–e, and can effectively prevent leaching of contaminants including heavy metal and metallic contaminants from the disposal sites by creating geostable, non-reactive compounds instead of simply physically containing contaminants the way traditional liner, cap and envelope systems do. FIG. 4a illustrates the use of the reactive barrier system underneath a traditional landfill liner. FIGS. 4b–e illustrate the use of the reactive barrier system alone in an aqueous environment.

The system and method may be used both in terrestrial sites, and partially or completely under water. However, when used in a terrestrial site, the reactive barrier material should be used in conjunction with another type of containment system, either as a redundant or secondary system, or it should be mixed with a cementing material or geofabric. While the necessary reactions require an aqueous environment, if the reactive barrier material is put down alone in a dry environment such as a terrestrial landfill and the landfill then fills with water, the water and dissolved organic compounds will pass through the barrier material due to the particulate nature of the reactive barrier material and the pressure of the water filling the disposal site. However, a secondary system is not necessary in water environments because there is no water pressure differential. The reactive barrier material is moistened, for example in a slurry, when it is put down under water, and remains in the aqueous environment so there is never a water pressure differential. The barrier formed of the resulting geostable compounds is stable over time, and would not succumb to geotechnical or biological stresses because the contaminants it contains become immobilized and neutralized as part of the structure of the barrier in a non-reactive and stable form, thereby chemically and physically reinforcing the barrier itself.

It is understood that various details of the invention may be changed without departing from the spirit and scope of the invention, and that the foregoing description is for non-limiting, illustrative purposes only, the invention being defined by the claims.

What is claimed is:

1. A phosphate mineral based reactive barrier system comprising:

a reactive phosphate material containing predominantly insoluble orthophosphate placed below, around, or on top of a contaminated material, forming;

a reactive interface between said reactive phosphate material and said contaminated material; such that contaminants in said contaminated material chemically react, via adsorption, surface precipitation and co-precipitation, with said reactive phosphate material at said reactive interface, and remain at said reactive interface, thereby creating an increasingly impermeable barrier and effectively preventing diffusion of contaminants in said contaminated material through said reactive phosphate material.

2. The phosphate mineral based reactive barrier system of claim 1 wherein said reactive phosphate material employed is in the form of a slurry, blended matrix, or composite.

3. The phosphate mineral based reactive barrier of claim 1 wherein said orthophosphate is initially in the form of a powder or crushed solid containing materials from the group consisting of: synthetic phosphate minerals, powders made from phosphate salts, natural geologic materials including phosphate rock, phosphate mining wastes, marine phosphorite deposits, phosphate fertilizer, and phosphogypsum waste.

4. The phosphate mineral based reactive barrier system of claim 1 wherein said reactive phosphate material is formed into a grout curtain, liner system, envelope, cap or combination thereof, to at least partially contain said contaminated material.

5. A method of stabilizing contaminated waste in a disposal site, comprising:

preparing a reactive phosphate barrier material containing phosphorus predominantly in the form of insoluble orthophosphate;

depositing said reactive phosphate barrier material in a prepared disposal site;

placing contaminated waste material in said prepared disposal site such that there is a reactive interface formed between said reactive phosphate barrier material and said contaminated waste material; and allowing contaminants in said contaminated material to react with said reactive phosphate barrier material at said reactive interface via adsorption, surface precipitation, and co-precipitation, thereby resulting in geochemically stable compounds containing said contaminants such that diffusion of said contaminants into and through said reactive barrier material is both physically and chemically retarded.

6. The method according to claim 5 wherein said depositing is performed by pumping said reactive phosphate barrier material into said prepared disposal site before said contaminated waste is added.

7. The method according to claim 5 wherein said reactive phosphate barrier material is prepared in a form chosen from the group consisting of: a slurry comprising a blend of said orthophosphate and an aqueous system; a blended matrix containing said orthophosphate in an aqueous system and additional stability agents; and a composite formed with a geofabric or geotextile.

8. The method according to claim 5 wherein said reactive phosphate barrier material is used as a grout curtain, liner system, cap, envelope, or combination thereof.

9. The method according to claim 5 wherein said orthophosphate is obtained from a powder or crushed solid containing materials from the group consisting of: synthetic phosphate minerals, powders made from phosphate salts, natural geologic materials including phosphate rock, phosphate mining wastes, marine phosphorite deposits, phosphate fertilizer, and phosphogypsum waste.

10. The method according to claim 5 wherein said contaminated waste treatable by said method is obtained from fine grained organic and inorganic materials from sources including river beds, bays, harbors, navigational channels and terrestrial wastes.

11. The method according to claim 5 wherein said method is employable entirely on land; above or below a water line within a bay, estuary, harbor, near shore, or off shore environment and within a freshwater, saline, estuarine, or marine setting.

12. The method according to claim 5 wherein acids or bases are added to said reactive phosphate barrier material to adjust the pH of said reactive phosphate barrier material to optimize reactions occurring at said reactive interface between said contaminants and said reactive phosphate barrier material.

13. A method of using orthophosphate to create a reactive barrier to chemically stabilize and physically immobilize waste materials in dredged materials, contaminated sediments, and wastes comprising:

preparing a predominantly insoluble orthophosphate mineral composition;

blending said insoluble orthophosphate mineral composition with an aqueous system;

pumping said blended insoluble orthophosphate mineral composition into, on, or around a disposal site in the form of a barrier, cap, envelope, or liner, thereby creating a reactive barrier comprising a reactive interface between said waste materials and said insoluble orthophosphate mineral composition such that said waste materials react with said insoluble orthophosphate mineral composition of said reactive barrier, via adsorption, surface precipitation and co-precipitation, and are thereby immobilized by said reactive barrier, becoming part of said reactive barrier and ensuring that said reactive barrier becomes increasingly geochemically stable to said waste materials.

\* \* \* \* \*